April 25, 1944.  F. J. LINKE  2,347,571
BRAKE FOR WHEELS
Filed Oct. 8, 1942
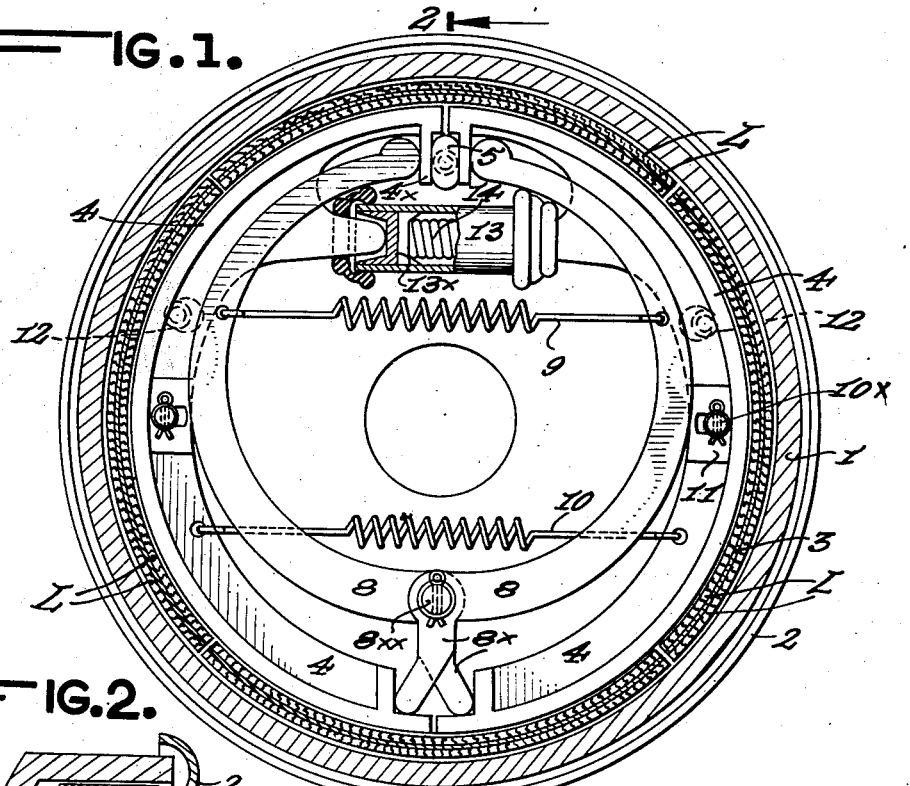
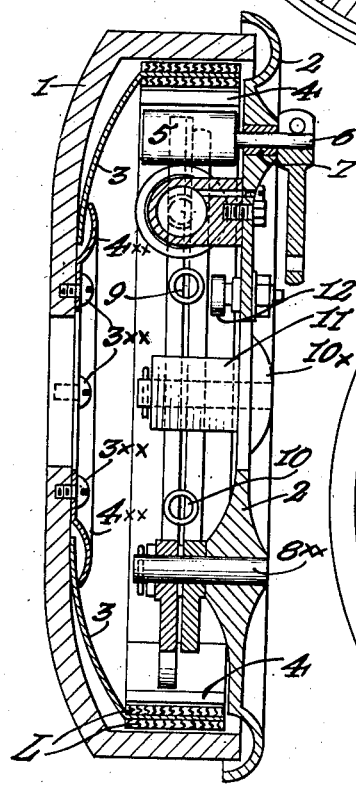
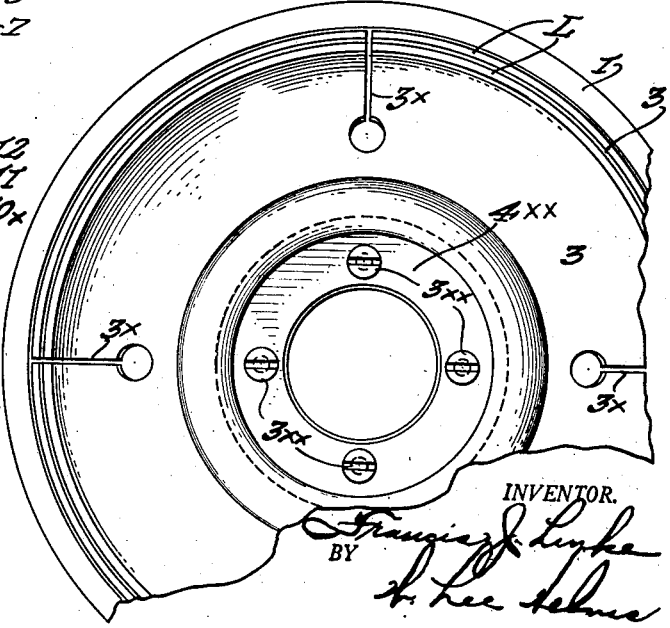
INVENTOR.

Patented Apr. 25, 1944

2,347,571

UNITED STATES PATENT OFFICE 2,347,571

BRAKE FOR WHEELS

Francis J. Linke, Elmira, N. Y.

Application October 8, 1942, Serial No. 461,242

2 Claims. (Cl. 188—78)

The object of the present invention is to provide a full and uniformly expanding hydraulic or manually operated brake particularly effective for automobile, truck and tractor wheels, and capable of universal use. The brake is so designed as to operate with a floating double brake lining having a friction surface of 720° or with a standard single lining carried by the brake shoes themselves.

The characteristics of the invention lie in the manner equal pressures are applied to the brake shoes and to the manner of holding the floating brake lining in the brake drum.

The invention will be described with reference to the accompanying drawing, in which:

Figure 1 is a vertical section through a brake drum showing an embodiment of the invention applied thereto, which embodiment employs a floating double brake lining.

Figure 2 is a transverse sectional view on the line 2—2, Figure 1.

Figure 3 is a view in elevation, partly broken away, illustrating the floating support for the brake lining and its retaining ring secured to the brake drum.

Referring to the drawing, I have shown at 1 a brake drum which may be of any suitable form and at 2 the brake supporting disk. At 3 is shown a steel annulus which provides the floating braking lining support. It is formed with a plurality of radial cuts at $3x$ each extending from a round hole, which cuts in the present embodiment are arranged at 90° apart so as to provide four areas of equal expanding action. On the angularly bent peripheral margin of each of said areas is applied two brake lining sections L, one on each side.

The floating brake lining support 3 is held in position by an annular retaining plate $4xx$ secured by machine screws $3xx$ to the brake drum 1.

The brake lining will be held with very slight frictional fit with respect to the brake drum. When the brake shoes 4 are applied the brake lining can slip relatively to both the drum and the shoes.

The brake shoes 4 are, as customary, two in number. At one end each is formed with a shoulder $4x$ for abutment with a cam 5, the latter being carried by a shaft 6 which is held in the aperture of a bushing 7 of brake carrying disk 2. At their opposite ends the shoulders of the brake shoes are abutted by the lever arms of two mutually pivoted brake operating levers, each of which has an end abutted by one of the two first named brake shoe shoulders so that when the cam moves them apart the levers also are activated. The pivot stud $8xx$ is carried by brake carrying disk 2. Thus the cam acts directly with expanding action at one end of the brake shoes and the lever acts directly with expanding action upon the opposite end of the brake shoes.

A spring 9 acts to normally hold the brake operating levers in neutral position, and a spring 10 acts to normally hold the brake shoes retracted.

The brake shoes are held against displacement and all movement except toward and from braking movement by heavy studs $10x$ which pass through slots in block members 11 secured to the brake shoes, one for each brake shoe. At 12 are indicated brake shoe adjusting eccentrics, which are customary expedients.

Near the top area of the brake carrying disk, the brake shoes 4 are each formed with an inwardly directed arm one arm abutting the casing of the hydraulic brake operating cylinder 13 and the other arm being received in and directly abutting the piston $13x$. A spring 14 is positioned in the cylinder 13 intermediate the pistons in accordance with the usual practice.

Operation

When the cam 5 or hydraulic cylinder 13 is moved or expanded the upper part of the brake shoes put a pressure onto the expanding brake shoe lever 8, thus expanding the lower end of the brake shoes, putting an equal pressure on the ends of the brake shoes causing uniform pressure on the brake lining sections. Because of this equal pressure on all points of the brake lining the brake always remains round and will not warp as is the trouble with present day brakes. The brake has long life and always remains in smooth operation.

The drawing shows the brake with the double floating lining but it can be used as a standard single lining brake by removing the floating lining and applying the brake lining onto the brake shoe itself as is being done with present day brakes.

An important feature is the way I get the equal pressure on the brake shoes with action of the expanding brake shoe jaws or levers and how I hold the floating brake lining in the brake drum.

This floating brake lining is an improvement on the well-known type of floating brake in which only a piece of brake lining lies in the brake drum and floats around. When it is worn it does not remain in place.

Having described my invention, what I claim and desire to secure by Letters Patent, is as follows:

1. In a brake construction, a brake lining and a brake holding disk of a pair of brake shoes each having two shoulders one at each end, the pair providing two sets of shoulders in which a shoulder of one brake shoe is opposed to and spaced from that of the second brake shoe, a pair of pivoted levers each having one end abutting a shoulder of one brake shoe and its opposite end abutting a shoulder of the second brake shoe, and means near one set of brake shoe shoulders for moving the brake shoes away from each other, said movement being transmitted by said last named set of shoulders to the second set of shoulders by the pivoted movement of said levers, each pivoted lever comprising a curved member having a bent section at one end extending substantially at right angles thereto, means pivoting the levers to the brake holding disk at the lever-joining terminus of their bent sections for movement on a common axis, and the bent sections of the levers being directed away from each other.

2. In a brake construction, a brake lining and a brake holding disk of a pair of brake shoes each having two shoulders one at each end, the pair providing two sets of shoulders in which a shoulder of one brake shoe is opposed to and spaced from that of the second brake shoe, a pair of pivoted levers each having one end abutting a shoulder of one brake shoe and its opposite end abutting a shoulder of the second brake shoe, and means near one set of brake shoe shoulders for moving the brake shoes away from each other, said movement being transmitted by said last named set of shoulders to the second set of shoulders by the pivoted movement of said levers, in combination with a brake lining carrier comprising a disk having a flanged periphery divided into sections by cuts extending from the peripheral flange into the body of the disk, brake lining sections carried at the opposite sides of each flange section, and means securing the disk to the brake drum, whilst permitting free bodily rotational movement of the disk.

FRANCIS J. LINKE.